(12) United States Patent
Shiba et al.

(10) Patent No.: US 8,637,152 B2
(45) Date of Patent: Jan. 28, 2014

(54) PACKAGING MATERIAL

(75) Inventors: Kenjin Shiba, Uji (JP); Takuma Yano, Uji (JP); Masafumi Yamada, Uji (JP); Takamasa Yoshino, Uji (JP)

(73) Assignee: Unitika Ltd., Hyogo (JP)

( * ) Notice: Subject to any disclaimer, the term of this patent is extended or adjusted under 35 U.S.C. 154(b) by 424 days.

(21) Appl. No.: 12/310,083

(22) PCT Filed: Sep. 6, 2007

(86) PCT No.: PCT/JP2007/067370
§ 371 (c)(1),
(2), (4) Date: Feb. 9, 2009

(87) PCT Pub. No.: WO2008/050546
PCT Pub. Date: May 2, 2008

(65) Prior Publication Data
US 2009/0269580 A1 Oct. 29, 2009

(30) Foreign Application Priority Data

Oct. 16, 2006 (JP) .................................. 2006-281375
Feb. 1, 2007 (JP) .................................. 2007-023548

(51) Int. Cl.
| | | |
|---|---|---|
| B32B 27/00 | (2006.01) |
| B32B 7/12 | (2006.01) |
| B32B 15/04 | (2006.01) |
| B32B 15/08 | (2006.01) |
| C08L 31/00 | (2006.01) |
| C08L 3/00 | (2006.01) |
| C08L 33/06 | (2006.01) |
| C09D 5/02 | (2006.01) |
| C08F 220/06 | (2006.01) |
| C09B 67/00 | (2006.01) |
| B28B 3/20 | (2006.01) |
| B29C 47/00 | (2006.01) |
| B05D 3/02 | (2006.01) |

(52) U.S. Cl.
USPC ............... 428/355 EN; 428/340; 428/354; 428/355 R; 428/355 AC; 428/461; 428/500; 524/556; 524/559; 524/560; 264/176.1; 427/338.1

(58) Field of Classification Search
USPC ............... 428/343, 340, 354, 355 R, 355 EN, 428/355 AC, 461, 500; 524/556, 559, 560; 264/176.1; 427/388.1
See application file for complete search history.

(56) References Cited

U.S. PATENT DOCUMENTS

| | | | |
|---|---|---|---|
| 6,777,096 B2 * | 8/2004 | Shiba et al. .................. 428/463 |
| 2002/0041943 A1 * | 4/2002 | Muggli et al. ............... 428/35.8 |
| 2003/0187128 A1 | 10/2003 | Shiba et al. |
| 2004/0014574 A1 * | 1/2004 | Lasson .......................... 492/56 |
| 2007/0037923 A1 * | 2/2007 | Shiba et al. .................. 524/556 |
| 2008/0061270 A1 * | 3/2008 | Tsuji et al. .................. 252/188.28 |

FOREIGN PATENT DOCUMENTS

| | | | |
|---|---|---|---|
| JP | 2-25327 | 1/1990 | |
| JP | 11-254595 | 9/1999 | |
| JP | 2002-319380 | 10/2002 | |
| JP | 2002 347181 | * 12/2002 | |
| JP | 2003-119328 | 4/2003 | |
| JP | 2004-66645 | 3/2004 | |
| JP | 2004-249656 | 9/2004 | |
| JP | 2006-82465 | 3/2006 | |
| WO | WO 2004104090 A1 | * 12/2004 | ............ C08L 23/14 |
| WO | WO 2005 123248 | * 12/2005 | |

* cited by examiner

*Primary Examiner* — Lorna M Douyon
*Assistant Examiner* — Tanisha Diggs
(74) *Attorney, Agent, or Firm* — Fildes & Outland, P.C.

(57) ABSTRACT

Disclosed is a packaging material, wherein a barrier layer, an adhesive layer and a sealant layer are laminated in this order, and the adhesive layer includes an acid-modified polyolefin resin that contains a (meth)acrylic acid ester component. The packaging material is preferably produced by forming on the barrier layer the adhesive layer including the acid-modified polyolefin resin that contains a (meth)acrylic acid ester component, and by subsequently laminating a molten sealant resin on the adhesive layer by extrusion lamination.

7 Claims, No Drawings

PACKAGING MATERIAL

This application is an application filed under 35 U.S.C. 371 of PCT/JP2007/067370, filed Sep. 6, 2007, which claims priority from Japan Application 2006-281375, filed Oct. 16, 2006 and Japan Application 2007-023548, filed Feb. 1, 2007.

TECHNICAL FIELD

The present invention relates to a packaging material.

BACKGROUND ART

As packaging materials, much used are materials each having a structure in which a polyolefin resin film is laminated as a sealant layer on the top surface of a barrier layer such as an aluminum foil. A packaging bag can be formed by mutually laminating and heat sealing the sealant layers of two sheets of a packaging material. In general, when a sealant layer is laminated on a barrier layer, an adhesive layer (also referred to as a primer, an anchor coat or the like) is disposed. In a packaging bag formed with a packaging material having such a structure, a volatile substance such as menthol or naphthalene, a content containing a fragrant component or a medicinal component, a secondary battery containing a solid organic electrolyte or the like is packaged, as the case may be. In such a case, there occurs a problem that during storage in the bag, such a substance or such a component may swell or dissolve the adhesive layer between the barrier layer and the sealant layer, and hence the adhesion strength between the barrier layer and the sealant layer is degraded with time, or both layers are detached from each other (delamination). For the purpose of solving this problem, improvements have been made as disclosed, for example, in JP-A-11-254595 and JP-A-2001-32221. However, depending on the types of the contents, the content resistance of the adhesive layer against the content cannot be said to be sufficient.

DISCLOSURE OF THE INVENTION

Problems to be Solved by the Invention

The present invention takes as its object the provision of a packaging material having an improved content resistance to various contents, by solving the above-described problems.

Means for Solving the Problems

As a result of a diligent study for the purpose of solving the above-described problems, the present inventors reached the present invention by discovering that by using as the adhesive layer a polyolefin resin having a specific composition, the resistance to the content is remarkably improved in a packaging material in which this resin is laminated as the adhesive layer between the barrier layer and the sealant layer.

Specifically, a first aspect of the gist of the present invention is a packaging material, wherein a barrier layer, an adhesive layer and a sealant layer are laminated in this order, and the adhesive layer includes an acid-modified polyolefin resin that contains a (meth)acrylic acid ester component.

Additionally, a second aspect of the gist of the present invention is a method for producing a packaging material, wherein an adhesive layer including an acid-modified polyolefin resin that contains a (meth)acrylic acid ester component is formed on a barrier layer, and a molten sealant resin is subsequently laminated on the adhesive layer by extrusion lamination.

Advantages of the Invention

The packaging material of the present invention is a packaging material in which an adhesive layer that makes a barrier layer and a sealant layer adhere to each other includes an acid-modified polyolefin resin that contains a (meth)acrylic acid ester component, and accordingly, has an excellent content resistance to various contents, and is small in the degradation of the laminate strength even when the contents are stored for a long term. Therefore, the packaging material of the present invention can shield the contents for a long term from liquids and gases so as not to impair the commercial value of the contents.

BEST MODE FOR CARRYING OUT THE INVENTION

Hereinafter, the present invention is described in detail.

In the packaging material of the present invention, a barrier layer, an adhesive layer and a sealant layer are laminated in this order, and the adhesive layer includes an acid-modified polyolefin resin that contains a (meth)acrylic acid ester component and, in other words, includes this resin as a main component.

Examples of the barrier layer includes soft metal foils such as an aluminum foil and deposition layers such as an aluminum deposition layer, a silica deposition layer, an alumina deposition layer and a silica-alumina binary deposition layer. Additionally, examples of the barrier layer may include organic barrier layers formed of vinylidene chloride resins, modified polyvinyl alcohols, ethylene-vinyl alcohol copolymer, MXD nylon or the like.

It is convenient to use, as the deposition layer, commercially available films having a deposition layer; examples of such films having a deposition layer may include: "IB series" manufactured by Dainippon Printing Co., Ltd.; "GL and GX series" manufactured by Toppan Printing Co., Ltd.; "Barrialox," "VM-PET," "YM-CPP" and "VM-OPP" manufactured by Toray Advanced Film Co., Ltd.; "Tecbarrier" manufactured by Mitsubishi Resin Co., Ltd.; "Metaline" manufactured by Tohcello Co., Ltd.; and "MOS," "Tetolight" and "P-bright" manufactured by Oike & Co., Ltd. The deposition layer may have a protective coat layer on the surface thereof.

Examples of the method for forming the organic barrier layer include a method in which a film is coated with a coating material containing a resin having barrier property, and a method in which the resin is laminated by coextrusion. Here, it is also convenient to use commercially available films having an organic barrier layer. Examples of such a film having an organic barrier layer may include: "Kurarister" and "Eval" manufactured by Kuraray Co., Ltd.; "Besela" manufactured by Kureha Chemical Industry Co., Ltd.; "Supernyl" manufactured by Mitsubishi Resin Co., Ltd.; "Kohbarrier" manufactured by Kohjin Co., Ltd.; "Sevix," "Emblon M," "Emblon E," "Emblem DC," "Emblet DC" and "NV" manufactured by Unitika Ltd.; "K-OP" and "A-OP" manufactured by Tohcello Co., Ltd.; and "Senesi" manufactured by Daicel Chemical Industries, Ltd.

The barrier property of the barrier layer can be appropriately selected according to the intended purposes such as the contents packaged with the packaging material of the present invention and the storage periods of the contents. By and large, the water vapor permeability is preferably 100 g/m$^2$·day (40° C., 90% RH) or less, more preferably 20 g/m$^2$·day or less, furthermore preferably 10 g/m$^2$·day or less and particularly preferably 1 g/m$^2$·day or less. The oxygen permeability is preferably 100 ml/m$^2$·day·MPa (20° C., 90%

RH) or less, more preferably 20 ml/m²·day·MPa or less, furthermore preferably 10 ml/m²·day·MPa or less and particularly preferably 1 ml/m²·day·MPa or less.

As the barrier layer, aluminum foil and deposition layers prepared by using aluminum, silica, alumina or the like are preferable from the viewpoint of the barrier property, and aluminum foil is more preferable from the viewpoint of low price. The thickness of the aluminum foil is not particularly limited, but is preferably within a range from 3 to 50 μm from the economical viewpoint.

In the packaging material of the present invention, the adhesive layer includes an acid-modified polyolefin resin that contains a (meth)acrylic acid ester component and, in other words, includes this resin as a main component.

The olefin component as the main component in the acid-modified polyolefin resin is not particularly limited, but is preferably an alkene having 2 to 6 carbon atoms such as ethylene, propylene, isobutylene, 2-butene, 1-butene, 1-pentene and 1-hexene, and may be a mixture of these alkenes. More preferable among these are alkenes having 2 to 4 carbon atoms such as ethylene, propylene, isobutylene and 1-butene, furthermore preferable are ethylene and propylene, and most preferable is ethylene.

The acid-modified polyolefin resin is prepared by acid modification with an unsaturated carboxylic acid component. Examples of the unsaturated carboxylic acid component used for that purpose include: acrylic acid, methacrylic acid, maleic acid, maleic anhydride, itaconic acid, itaconic anhydride, fumaric acid and crotonic acid; and half esters and half amides of unsaturated dicarboxylic acids. Preferable among these are acrylic acid, methacrylic acid, maleic acid and maleic anhydride, and particularly preferable are acrylic acid and maleic anhydride. The unsaturated carboxylic acid component is only required to be copolymerized in the acid-modified polyolefin resin, and the form of the copolymerization is not limited. Examples of the copolymerization form include random copolymerization, block copolymerization and graft copolymerization (graft modification).

The content of the unsaturated carboxylic acid component in the acid-modified polyolefin resin is preferably 0.01 to 10% by mass, more preferably 0.1 to 5% by mass, furthermore preferably 0.5 to 4% by mass and particularly preferably 1 to 4% by mass, from the viewpoint of the balance of the adhesion for making the barrier layer and the sealant layer adhere to each other. When the content is less than 0.01% by mass, no sufficient adhesion to the barrier layer such as an aluminum foil may be obtained. On the other hand, when the content exceeds 10% by mass, the adhesion to the sealant layer may be degraded.

The acid-modified polyolefin resin used in the adhesive layer is required to contain a (meth)acrylic acid ester component. When this component is not contained, no sufficient adhesion to the barrier layer or to the sealant layer is obtained. Examples of the (meth)acrylic acid ester component include esterification product between (meth)acrylic acid and alcohols having 1 to 30 carbon atoms. Preferable among such esterification products are the esterification products between (meth)acrylic acid and alcohols having 1 to 20 carbon atoms from the viewpoint of easy availability.

Specific examples of the (meth)acrylic acid ester component include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, dodecyl (meth)acrylate and stearyl (meth)acrylate. Mixtures of these may also be used. From the viewpoints of easy availability and adhesion, more preferable among these are methyl (meth)acrylate, ethyl (meth)acrylate, butyl (meth)acrylate, hexyl acrylate and octyl acrylate, furthermore more preferable are ethyl acrylate and butyl acrylate, and particularly preferable is ethyl acrylate.

Here, "a substituent name followed by (meth)acrylate" means "the substituent name followed by acrylate" or "the substituent name followed by methacrylate."

The content of the (meth)acrylic acid ester component in the acid-modified polyolefin resin is preferably 0.1 to 25% by mass, more preferably 1 to 20% by mass, furthermore preferably 2 to 18% by mass and particularly preferably 3 to 15% by mass, from the viewpoint that the content resistance is improved. When the content of the (meth)acrylic acid ester component is less than 0.1% by mass, the adhesion to the aluminum foil or to the polyolefin resin film tends to be degraded, and when the content of the (meth)acrylic acid ester component exceeds 25% by mass, the content resistance tends to be degraded. The (meth)acrylic acid ester component is only required to be copolymerized in the acid-modified polyolefin resin, and the form of the copolymerization is not limited. Examples of the copolymerization form include random copolymerization, block copolymerization and graft copolymerization (graft modification).

As a specific example of the acid-modified polyolefin resin that contains a (meth)acrylic acid ester component, ethylene-(meth)acrylic acid ester-maleic anhydride copolymer is most preferable. The form of the copolymer may be any of a random copolymer, a block copolymer, a graft copolymer and the like; however, from the viewpoint of easy availability, a random copolymer and a graft copolymer are preferable.

The amount of the adhesive layer, in relation to the area of the adhesive surface, is preferably within a range from 0.001 to 5 g/m², more preferably from 0.01 to 3 g/m², furthermore preferably from 0.02 to 2 g/m², particularly preferably from 0.03 to 1 g/m² and most preferably from 0.05 to 1 g/m². When the amount is less than 0.001 g/m², no sufficient content resistance is obtained, and the case where the amount exceeds 5 g/m² is economically disadvantageous.

As for the acid-modified polyolefin resin used in the adhesive layer, the higher is the molecular weight thereof, the more satisfactory is the content resistance. Accordingly, the melt flow rate, at 190° C. and at a load of 21.3 N (2160 g), to be a measure of molecular weight is preferably 100 g/10 min or less, more preferably 30 g/10 min or less, furthermore preferably 0.001 to 20 g/10 min and particularly preferably 0.01 to 10 g/10 min. When the melt flow rate exceeds 100 g/10 min, the content resistance tends to be degraded, and when the melt flow rate is less than 0.001 g/10 min, the production aspect, at the time of enhancement of the molecular weight of the resin, undergoes constraint.

The adhesive layer may also include a small amount (20% by mass or less) of a resin other than the acid-modified polyolefin resin. Examples of such a resin include polyvinyl acetate, ethylene-vinyl acetate copolymer, polyvinyl chloride, polyvinylidene chloride, ethylene-(meth)acrylic acid copolymer, styrene-maleic acid resin, styrene-butadiene resin, butadiene resin, acrylonitrile-butadiene resin, poly (meth)acrylonitrile resin, (meth)acrylamide resin, chlorinated polyethylene resin, chlorinated polypropylene resin, polyester resin, modified nylon resin, urethane resin, phenolic resin, silicone resin and epoxy resin. From the viewpoint of the content resistance, the number average molecular weights of these resins are preferably 10000 or more and more preferably 30000 or more.

The adhesive layer may also include a cross-linking agent for cross-linking the acid-modified polyolefin resin. Examples of such a cross-linking agent include isocyanate compounds, melamine compounds, urea compounds, epoxy compounds, carbodiimide compounds, oxazoline compounds, aziridine compounds, zirconium salt compounds and silane coupling agents. The content of the cross-linking agent may be appropriately determined in consideration of the content resistance.

For the sealant layer of the packaging material of the present invention, known sealant resins can be used. Usable examples of the sealant resin include: polyolefin resins such as polyethylenes such as low density polyethylene (LDPE) and high density polyethylene (HDPE), acid-modified polyethylene, polypropylene, acid-modified polypropylene, copolymerized polypropylene, ethylene-vinyl acetate copolymer, ethylene-(meth)acrylic acid ester copolymer, ethylene-(meth)acrylic acid copolymer and ionomers. Among these, polyethylene resins are preferable from the viewpoint of the low-temperature sealing property, and polyethylene is particularly preferable because of being inexpensive.

In the present invention, the method for providing the adhesive layer is not particularly limited; however, examples of such a method include: a method in which the acid-modified polyolefin resin is dissolved or dispersed to prepare a coating material, and the coating material is applied to the barrier layer and then the medium is dried; a method in which the acid-modified polyolefin resin is dissolved or dispersed to prepare a coating material, the coating material is applied to a release paper, and then the resin layer obtained by drying the medium is transferred to the barrier layer; and a method in which the acid-modified polyolefin resin is melt-extruded through a T-die onto the barrier layer.

From the environmental aspect and the performance aspect, preferable among such methods is the method in which a coating material (aqueous dispersion) prepared by dissolving or dispersing the acid-modified polyolefin resin in an aqueous medium is applied to the barrier layer, and then the medium is dried because the method allows easy regulation of the amount of the acid-modified polyolefin resin layer (namely, the adhesive layer), and in particular, easy control of the thickness so as to be thin. When an aqueous dispersion is used, convenient and particularly preferable is a method in which the aqueous dispersion is applied to the barrier layer and dried to form the adhesive layer, and then a sealant resin is melt-extruded (extrusion lamination) in an in-line manner to laminate the sealant layer.

Examples of the aqueous dispersion of the acid-modified polyolefin resin, suitable for such a method as described above, include the aqueous dispersion described in WO 02/055598.

When an aqueous dispersion is used, usable examples of the coating method of the aqueous dispersion include known methods such as gravure roll coating, reverse roll coating, wire bar coating, lip coating, air knife coating, curtain flow coating, spray coating, immersion coating and brush coating. By means of any of these methods, the surface of the barrier layer is uniformly coated with an aqueous dispersion; setting is conducted where necessary around room temperature; thereafter, drying treatment or heating treatment for drying is applied, and thus, a uniform adhesive layer can be formed so as to adhere to the surface of the barrier layer.

When an aqueous dispersion is used, for the purpose of preventing the content resistance of the finally obtained packaging material from being degraded, it is preferable to use an emulsifying agent or a compound having a colloid-protecting function in an amount as small as possible, and it is most preferable not to use such an agent or such a compound.

The method for laminating sealant layer on the adhesive layer is not particularly limited; however, examples of such a method include: a method (thermal lamination or dry lamination) in which a sealant film formed of the sealant resin and the adhesive layer are thermally bonded to each other; and a method (extrusion lamination) in which the molten, above-described resin is extruded onto the adhesive layer to be bonded to the adhesive layer. Preferable among such methods is the extrusion lamination method, from the viewpoint that this method enables the adhesive layer to be formed as a thin layer and from the viewpoint of the content resistance of the obtained packaging material.

The packaging material of the present invention is usually used with the barrier layer as the outer side and the sealant layer as the inner side (the side of the content). However, other layers may be laminated where necessary in consideration of the applications of the packaging material or the rigidity or durability required for the packaging material. It is preferable to provide a substrate layer such as a thermoplastic resin film, a synthetic paper or a paper in the portion facing the outside of the packaging material or the portion on the inside of the packaging material, in the barrier layer.

In particular, in the step of laminating the barrier layer, the adhesive layer and the sealant layer, it is preferable to use the barrier layer as the laminated body formed of the barrier layer and the substrate layer.

Examples of the thermoplastic resin film used for such a substrate layer include: films of polyester resins such as polyethylene terephthalate (PET), polyethylene naphthalate (PEN) and polylactic acid (PLA); films of polyolefin resins such as polypropylene; films of polystyrene resins; films of polyamide resins such as 6-nylon, poly-p-xylylene adipamide (MXD6 nylon); films of polycarbonate resins; films of polyacrylonitrile resins; films of polyimide resins; multilayer bodies formed of these films (for example, nylon 6/MXD6/nylon 6, nylon 6/ethylene-vinyl alcohol copolymer/nylon 6); and mixtures of these. Preferable among these are films which have mechanical strength and dimensional stability. In particular, films obtained by optionally stretching these films in biaxial directions are preferably used. The thermoplastic resin film may contain known additives and stabilizers such as an antistatic agent, a plasticizer, a lubricant and an antioxidant. Additionally, the surface of the thermoplastic resin film may be subjected to, as pretreatments, corona treatment, plasma treatment, ozone treatment, chemical treatment, solvent treatment and the like, for the purpose of improving the adhesion at the time of lamination with the barrier layer.

The thermoplastic resin film may also be subjected to various coatings such as easy-adhesion coating and antistatic coating.

The thickness of the thermoplastic resin film is not particularly limited however, in consideration of the adequacy as packaging material and the workability in lamination with other layers, practically the thickness of the thermoplastic resin film is preferably within a range from 3 to 300 µm and, depending on the application, more preferably within a range from 5 to 30 µm.

Additionally, between the substrate layer and the barrier layer or between the barrier layer and the sealant layer, a polyamide film, a polyolefin film or the like may be laminated for the purpose of enhancing the property such as impact resistance and anti-pinhole property, or a film having easy tear property or hand cut property may be laminated for the purpose of enhancing the easy tear property or hand cut property.

The method for laminating the barrier layer and the substrate layer such as a thermoplastic resin film, a synthetic paper or a paper is not particularly limited; however, a known adhesive such as a two-part adhesive used by mixing a main ingredient having a hydroxyl group or a carboxyl group and an isocyanate compound may be used. When a deposition layer as the barrier layer is provided on the various substrates, known methods may be used. Also, when an organic barrier layer is provided on the substrate, known methods may be used.

Examples of the forms, adopted at the time of bag making by using the packaging material of the present invention, include various forms such as three-side sealed bags, four-side sealed bags, gusset packaging bags and pillow packaging bags. Packaging bags with a fastener may also be formed by providing a fastener made of polypropylene resin on the innermost layer, namely, the sealant layer.

The packaging material of the present invention has a satisfactory content resistance to various contents, and hence is suitable particularly as the packaging material for contents having volatility, and is most suitable as the packaging material for, among others, fragrant components, spice components and medicinal components. Specifically, the packaging material of the present invention is suitably used as the packaging material for aromatic substances, fragrant substances, bath water additives, spices, poulticing agents, medicines, secondary batteries, toiletry products, surfactants, shampoos, rinses, detergents, insect repellents, pesticides, deodorants, hair growth tonics, vinegars, dentifrices and cosmetics.

The details of the cause for the decrease of the adhesion strength between the layers in the packaging material having barrier property are not clear. However, conceivably this is because the volatile component of the content is shielded by the barrier layer and accumulated in the vicinity of the interface between the barrier layer and the adhesive layer, and consequently the adhesive layer undergoes deterioration such as swelling or dissolution. It may be presumed that by using the adhesive layer having such a specific composition as adopted in the packaging material of the present invention, the deterioration of the adhesive layer is alleviated, and consequently a satisfactory content resistance is obtained.

EXAMPLES

Hereinafter, the present invention is specifically described with reference to Examples. However, the present invention is not limited by these Examples.

(1) The Constitution of the Acid-Modified Polyolefin Resin

The constitution of the acid-modified polyolefin resin was derived by means of $^1$H-NMR analysis (used was an analytical instrument manufactured by Varian Inc., 300 MHz). Measurement was conducted by using ortho-dichlorobenzene ($d_4$) as the solvent and at 120° C.

(2) The Melt Flow Rate of the Acid-Modified Polyolefin Resin

Measurement was conducted according to the method described in JIS K7210 (1999) [at a temperature of 190° C. and at a load of 21.3 N (2160 g)].

(3) The Amount of the Adhesive Layer (Coating Amount)

The area and the mass of the body obtained by laminating the barrier layer on the substrate were beforehand measured. A predetermined amount of an aqueous dispersion of the acid-modified polyolefin resin was applied to the barrier layer, and dried at 100° C. for 2 minutes. The mass of the thus obtained three-layered laminated body was measured, and from this measured value, the mass before coating was subtracted to obtain the coating amount. From the coating amount and the coating area, the layer amount per unit area (g/m$^2$) was calculated.

(4) Laminate Strength (Before the Test of the Content Resistance)

From a laminate film as a packaging material, a 15-mm-wide specimen was sampled, and the strength was measured with a tensile tester (Precision Universal Material Tester Model 2020, manufactured by Intesco Co., Ltd.), on the basis of the T-peel method by peeling the interface between the barrier layer and the sealant layer from an end of the specimen. The measurement was conducted in an atmosphere of 20° C. and 65% RH at a tensile speed of 200 mm/min. The laminate strength of 5 N/15 mm width or more is at a problem-free level and is preferable for application as a packaging material. When the laminate strength is high, elongation or break is caused in the sealant film at the time of measurement to preclude the peeling as the case may be; however, such a phenomenon is most preferable as the laminate state, and the laminate strength can be regarded as exceeding 10 N/15 mm width.

(5) Content Resistance

Two 10-cm-square sheets of a laminate film as a packaging material was used; the sealant layer was set as the inner side, and a lump of absorbent cotton impregnated with 1 g of acetic acid as a content was put inside and hermetically sealed by heat sealing the four sides with a sealing width of 10 mm, and the package thus prepared was stored at 50° C. for 2 weeks. Other samples respectively containing as the content 1 g of L-menthol and 1 g of limonene in place of 1 g of acetic acid were sealed and stored in the same manner as described above. Thereafter, the individual sealed packaging materials were unsealed, specimens were sampled from the laminate films of the packaging materials and the laminate strength of each of the specimens was measured in the same manner as in the above-described (4), and thus the content resistance of each of the specimens was evaluated.

(6) Tear Property

At the time of unsealing the bag after the content resistance test using L-menthol, a portion of the bag was cut, the bag was torn with hands and the condition of the torn bag was visually observed to be evaluated on the basis of the following standards.

G (Good): The tear property was satisfactory, and no delamination between films was found.

P (Poor): The tear property was poor, and the delamination between the films was found.

[Gas-Barrier Performance of Each of the Films]

The gas-barrier performance of each of the films used in following Examples and Comparative Examples is as follows.

Aluminum deposition film (Metaline ML-PET, manufactured by Tohcello Co., Ltd.)
 Oxygen permeability: 10 ml/m$^2$·day·MPa (JIS K7126)
 Water vapor permeability: 1 g/m$^2$·day (JIS Z0208)
Silica deposition film (Tecbarrier VX, manufactured by Mitsubishi Resin Co., Ltd.)
 Oxygen permeability: 5 ml/m$^2$·day·MPa (25° C., 90% RH)
 Water vapor permeability: 0.5 g/m$^2$·day (40° C., 90% RH)
Alumina deposition film (GL-AE, manufactured by Toppan Printing Co., Ltd)
 Oxygen permeability: 5 ml/m$^2$·day·MPa (30° C., 70% RH)
 Water vapor permeability: 0.6 g/m$^2$·day (40° C., 90% RH)
Barrier film (Emblet DC KPT, manufactured by Unitika Ltd.)
 Oxygen permeability: 95 ml/m$^2$·day·MPa (20° C., 65% RH)
 Water vapor permeability: 13 g/m$^2$·day (40° C., 90% RH)

Reference Example 1

Production of an Aqueous Dispersion E-1 of an Acid-Modified Polyolefin Resin that Contains a (Meth)Acrylic Acid Ester Component By using a stirrer having a 1-liter volume, hermetically sealable pressure-resistant glass vessel equipped with a heater, 60.0 g of an acid-modified polyolefin resin (Bondine TX-8030, manufactured by Arkema Co., Ltd.), 90.0 g of isopropanol, 3.0 g of triethylamine and 147.0 g of distilled water were placed in the glass vessel, and stirred at a rotation speed of stirring blades set at 300 rpm. Thus, no precipitation of the granular resin was found on the bottom of the vessel, and the resin was verified to take a floating state. Accordingly, after 10 minutes, while this state was being maintained, the power of the heater was turned on for heating. Thus, while the temperature within the reaction system was being maintained at 140 to 145° C., the reaction system was stirred further for 30 minutes. Then, the reaction system was cooled down to room temperature (about 25° C.) in a water bath under stirring at the unaltered rotation speed of 300 rpm, and then pressure-filtered (air pressure: 0.2 MPa), with a 300-mesh stainless steel filter (wire diameter: 0.035 mm, plain weave) to yield a milky white, uniform aqueous dispersion E-1 of an acid-modified polyolefin resin.

Reference Example 2

Production of an Aqueous Dispersion E-2 of an Acid-Modified Polyolefin Resin that Contains a (Meth)Acrylic Acid Ester Component Bondine HX-8290 (manufactured by Arkema Co., Ltd.) was used as an acid-modified polyolefin resin, and the same operations as in the production of the aqueous dispersion E-1 were conducted to yield an aqueous dispersion E-2 of an acid-modified polyolefin resin.

Reference Example 3

Production of an Aqueous Dispersion E-3 of an Acid-Modified Polyolefin Resin that Contains No (Meth)Acrylic Acid Ester Component By using a stirrer having a 1-liter volume, hermetically sealable pressure-resistant glass vessel equipped with a heater, 60.0 g of an ethylene-acrylic acid copolymer resin (Primacor 5980I, manufactured by Dow Chemical Co.), 16.8 g of triethylamine (TEA) and 223.2 g of distilled water were placed in the glass vessel, and stirred at a rotation speed of stirring blades set at 300 rpm. Thus, no precipitation of the granular resin was found on the bottom of the vessel, and the resin was verified to take a floating state. Accordingly, after 10 minutes, while this state was being maintained, the power of the heater was turned on for heating. Thus, while the temperature within the reaction system was being maintained at 140 to 145° C., the reaction system was stirred further for 30 minutes. Then, the reaction system was cooled down to room temperature (about 25° C.) in a water bath under stirring at the unaltered rotation speed of 300 rpm, and then pressure-filtered (air pressure: 0.2 MPa), with a 300-mesh stainless steel filter (wire diameter: 0.035 mm, plain weave) to yield a slightly clouded aqueous dispersion E-3, almost without finding any resin remaining on the filter.

Table 1 shows the compositions of the acid-modified polyolefin resins used in the production of the aqueous dispersions E-1 to E-3.

TABLE 1

| Aqueous dispersion | Acid-modified polyolefin resin | Composition of acid-modified polyolefin resin (% by mass) | | | | Melt flow rate (g/10 min) | Melting point (° C.) |
|---|---|---|---|---|---|---|---|
| | | Ethylene | Ethyl acrylate | Acrylic acid | Maleic anhydride | | |
| E-1 | Bondine TX-8030 | 85 | 12 | 0 | 3 | 3 | 95 |
| E-2 | Bondine HX-8290 | 80 | 18 | 0 | 2 | 65 | 81 |
| E-3 | Primacor 5980I | 80 | 0 | 20 | 0 | 300 | 79 |

Example 1

A 12-µm-thick biaxially stretched polyester resin film (Emblet PET-12, manufactured by Unitika Ltd.) was used as a substrate, a two-part curing type polyurethane adhesive (manufactured by Toyo-Morton, Ltd.) was applied to the corona-treated surface of this polyester resin film by using a gravure coater so as for the coating amount after drying to be 5 g/m$^2$ and dried, and then as a barrier layer, a 7-µm-thick aluminum foil was bonded onto the polyurethane layer, and thus a barrier substrate was obtained. Next, to the aluminum foil surface of the barrier substrate, a 10 diluted liquid of the aqueous dispersion E-1 of an acid-modified polyolefin resin that contained a (meth)acrylic acid ester component was applied so as for the coating amount after drying to be 0.7 g/m$^2$, and dried at 100° C. for 2 minutes to form an adhesive layer. Next, by using a laminator equipped with an extruder, LDPE (L211, manufactured by Sumitomo Chemical Co., Ltd.) was melt-extruded as a sealant resin onto and bonded to the surface of the adhesive layer to yield a laminate film as a packaging material having a sealant layer formed of a 30-µm LDPE layer.

Example 2

In place of the aqueous dispersion E-1 of an acid-modified polyolefin resin that contained a (meth)acrylic acid ester component in Example 1, the aqueous dispersion E-2 of an acid-modified polyolefin resin that contained a (meth)acrylic acid ester component was used. Otherwise the same operations in Example 1 were conducted to yield a laminate film as a packaging material.

Example 3

The coating amount of the adhesive layer was set at 0.07 g/m². Otherwise the same operations as in Example 1 were conducted to yield a laminate film as a packaging material.

Example 4

In place of LDPE in Example 1, as a sealant resin, an ethylene-methacrylic acid copolymer (Nucrel AN4228C, manufactured by Mitsui-DuPont Chemical Co., Ltd.) was used. Otherwise the same operations as in Example 1 were conducted to yield a laminate film as a packaging material.

Comparative Example 4

As compared to Example 4, no adhesive layer was formed, and an ethylene-methacrylic acid copolymer was melt-extruded directly onto and bonded to the aluminum foil surface of the barrier substrate to yield a laminate film as a packaging material.

For each of the packaging materials made of the laminate films obtained in Examples 1 to 4 and Comparative Examples 1 to 4, the laminate strength was measured and the tear property was evaluated before and after the content resistance test. The results thus obtained are shown in Table 2.

TABLE 2

|  |  |  | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|---|---|
|  | Resin of adhesive layer | | TX-8030 | HX8290 | TX-8030 | TX-8030 | 5980I | HUX380 | None | None |
|  | Barrier layer | | Aluminum foil | Aluminum foil | Aluminum foil | Aluminum foil | Aluminum foil | Aluminum foil | Aluminum foil | Aluminum foil |
|  | Amount of adhesive layer (g/m²) | | 0.7 | 0.7 | 0.07 | 0.7 | 0.7 | 0.7 | — | — |
|  | Sealant resin | | LDPE | LDPE | LDPE | AN4228C | LDPE | LDPE | LDPE | AN4228C |
| Laminate strength | Before test | | Unpeelable | Unpeelable | Unpeelable | 9.5 | 7.0 | 7.5 | 2.0 | 6.0 |
|  | After test | Content: Acetic acid | Unpeelable | 9.0 | Unpeelable | 9.5 | Delami. | Delami. | Delami. | 3.5 |
|  |  | Content: Menthol | Unpeelable | 6.5 | Unpeelable | 9.0 | Delami. | Delami. | Delami. | 2.5 |
|  |  | Content: Limonene | Unpeelable | 5.0 | Unpeelable | 8.5 | Delami. | Delami. | Delami. | 1.0 |
|  | Tear property | | G | G | G | G | P | P | P | P |

Unit of laminate strength: N/15 mm width
"Unpeelable" means that elongation, break or the like is generated in the sealant film at the time of measurement (a phenomenon observed in the case of high strength).
"Delami." means that after the content was hermetically sealed in the package and was stored at 50° C. for 2 weeks, the laminate film underwent delamination and hence no laminate strength measurement was conducted.
TX-8030: Bondine TX-8030, manufactured by Arkema Co., Ltd.; HX-8290: Bondine HX-8290, manufactured by Arkema Co., Ltd.; 5980I: Primacor 5980I, manufactured by Dow Chemical Co.; HUX380: Adekabontiter HUX380, manufactured by Asahi Denka Co., Ltd.; LDPE: Low density polyethylene L211, manufactured by Sumitomo Chemical Co., Ltd.; AN4228C: Nucrel AN4228C, manufactured by Mitsui-DuPont Chemical Co., Ltd.

Comparative Example 1

In place of the aqueous dispersion E-1 of an acid-modified polyolefin resin that contained a (meth)acrylic acid ester component in Example 1, the aqueous dispersion E-3 of an acid-modified polyolefin resin that contained no (meth) acrylic acid ester component was used. Otherwise in the same manner as in Example 1, a laminate film as a packaging material was obtained.

Comparative Example 2

In place of the acid-modified polyolefin resin in Example 1, a polyurethane resin was used as the adhesive layer. In other words, the same operations as in Example 1 were conducted by replacing E-1 with an aqueous dispersion of a polyurethane resin (Adekabontiter HUX380, manufactured by Asahi Denka Co., Ltd.) to yield a laminate film as a packaging material.

Comparative Example 3

As compared to Example 1, no adhesive layer was formed, and LDPE was melt-extruded directly onto and bonded to the aluminum foil surface of the barrier substrate to yield a laminate film as a packaging material.

Example 5

As compared to Example 1, as the sealant resin, a propylene resin (Ultzex 1520L, manufactured by Prime Polymer Co., Ltd.) was used. Otherwise the same operations as in Example 1 were conducted to yield a laminate film as a packaging material.

Example 6

The same gas-barrier substrate as in Example 1 was used. To the aluminum foil surface of this gas-barrier substrate, the same aqueous dispersion E-1 as in Example 1 of an acid-modified polyolefin resin that contained a (meth)acrylic acid ester component was applied so as for the coating amount after drying to be 3 g/m², and dried at 100° C. for 2 minutes to form an adhesive layer. Next, the laminated body obtained by thus laminating the adhesive layer on the gas-barrier substrate was made to pass through a heated nip roll to bond a 50-µm-thick polyethylene film (manufactured by Tamapoly Co., Ltd.) as sealant onto the adhesive layer to yield a laminate film as a packaging material.

Example 7

As compared to Example 6, a 50-µm unstretched polypropylene film (manufactured by Toray) was used as the sealant film. Otherwise the same operations as in Example 6 were conducted to yield a laminate film as a packaging material.

Example 8

As the gas-barrier substrate, an aluminum deposition film [Metaline ML-PET (a product obtained by forming an aluminum deposition layer as a barrier layer on a 12-μm-thick PET film), manufactured by Tohcello Co., Ltd.] was used. To the barrier layer surface (deposition surface) of this film, a 10% diluted liquid of the aqueous dispersion E-1 of an acid-modified polyolefin resin that contained a (meth)acrylic acid ester component was applied so as for the coating amount after drying to be 0.3 g/m², and dried at 100° C. for 2 minutes to form an adhesive layer. Next, by using a laminator equipped with an extruder, LDPE (L211, manufactured by Sumitomo Chemical Co., Ltd.) was melt-extruded as a sealant resin onto the surface of the adhesive layer to yield a laminate film having a sealant layer formed of a 30-μm LDPE layer.

Example 9

In place of the aluminum deposition film of Example 8, a silica deposition film [Tecbarrier VX (a product obtained by forming a silica deposition layer as a barrier layer on a 12-μm-thick PET film), manufactured by Mitsubishi Resin Co., Ltd.] was used. Otherwise the same operations as in Example 8 were conducted to yield a laminate film as a packaging material.

Example 10

In place of the aluminum deposition film of Example 8, an alumina deposition film [GL-AE (a product obtained by forming an alumina deposition layer as a barrier layer on a 12-μm-thick PET film), manufactured by Toppan Printing Co., Ltd.] was used. Otherwise the same operations as in Example 8 were conducted to yield a laminate film as a packaging material.

Example 11

In place of the aluminum deposition film of Example 8, a barrier coat film obtained by forming an organic barrier layer [Emblet DC KPT (a product obtained by forming a polyvinylidene chloride layer as an organic barrier layer on a 12-μm-thick PET film), manufactured by Unitika Ltd.] was used. Otherwise the same operations as in Example 8 were conducted to yield a laminate film.

For each of the packaging materials made of the laminate films obtained in Examples 5 to 11, the laminate strength was measured and the tear property was evaluated before and after the content resistance test. The results thus obtained are shown in Table 3.

As can be seen from Examples 1 to 11, the packaging materials adopting as the adhesive layer an acid-modified polyolefin resin that contained a (meth)acrylic acid ester component exhibited satisfactory content resistance to various contents. In other words, after the content resistance test, these packaging materials were found to have a laminate strength of 5 N/15 mm width or more, or to be high in laminate strength and accordingly unpeelable. Additionally, these packaging materials were found to be satisfactory in tear property and to be at a problem-free level in application as packaging materials. As for the acid-modified polyolefin resin, the smaller the amount of the acrylic acid ester was and the lower the melt flow rate was in value, that is, the higher the molecular weight was, the degradation of the laminate strength was found to be the smaller. As for the sealant resin, the use of polyethylene was verified to tend to give more satisfactory results.

On the other hand, the content resistance was largely degraded in the case (Comparative Example 1) where an acid-modified polyolefin resin that contained no (meth)acrylic acid ester component was used for the adhesive layer and the case (Comparative Example 2) where no acid-modified polyolefin resin was used. Similarly, in the cases (Comparative Examples 3 and 4) where no adhesive layer was provided, the content resistance was largely degraded.

The invention claimed is:
1. A packaging material consisting of:
a barrier layer, an acid-modified polyethylene resin adhesive layer and a sealant layer laminated in this order,
the acid-modified polyethylene resin adhesive layer consists of an ethylene component, a (meth)acrylic acid ester component and an unsaturated carboxylic acid component,
the content of the (meth)acrylic acid ester component in the acid-modified polyethylene resin is 2 to 18% by mass,
the content of the unsaturated carboxylic acid component in the acid-modified polyethylene resin is 1 to 4% by mass, and
the melt flow rate of the acid-modified polyethylene resin at 190° C. and a load of 21.3N (2160 g g) is 100 g/10 min or less.
2. The packaging material according to claim 1, wherein an amount of the adhesive layer is 0.001 to 5 g/m².
3. The packaging material according to claim 1, wherein the barrier layer is an aluminum layer.
4. The packaging material according to claim 1, wherein the sealant layer is a polyolefin resin layer.

TABLE 3

|  |  |  | Ex. 5 | Ex. 6 | Ex. 7 | Ex. 8 | Ex. 9 | Ex. 10 | Ex. 11 |
|---|---|---|---|---|---|---|---|---|---|
|  | Resin of adhesive layer |  | TX-8030 | TX-8030 | TX-8030 | TX-8030 | TX-8030 | TX-8030 | TX-8030 |
|  | Barrier layer |  | Aluminum foil | Aluminum foil | Aluminum foil | Aluminum deposition | Silica deposition | Alumina deposition | Organic |
|  | Amount of adhesive layer (g/m²) |  | 0.7 | 3 | 3 | 0.3 | 0.3 | 0.3 | 0.3 |
|  | Sealant resin |  | PP | PE | CPP | LDPE | LDPE | LDPE | KPT |
| Laminate strength |  | Before test | Unpeelable | 8.0 | 6.0 | Unpeelable | Unpeelable | Unpeelable | Unpeelable |
|  | After test | Content: Acetic acid | Unpeelable | 7.0 | 5.5 | Unpeelable | Unpeelable | Unpeelable | Unpeelable |
|  |  | Content: Menthol | Unpeelable | 5.0 | 4.0 | Unpeelable | Unpeelable | Unpeelable | Unpeelable |
|  |  | Content: Limonene | Unpeelable | 5.0 | 4.0 | Unpeelable | Unpeelable | Unpeelable | Unpeelable |
|  | Tear property |  | G | G | G | G | G | G | G |

Unit of laminate strength: N/15 mm width

"Unpeelable" means that elongation, break or the like is generated in the sealant film at the time of measurement (a phenomenon observed in the case of high strength).

TX-8030: Bondine TX-8030, manufactured by Arkema Co., Ltd.; PP: Ultzex 1520L, manufactured by Prime Polymer Co., Ltd.; PE: Polyethylene film, manufactured by Tamapoly Co., Ltd.; CPP: Polypropylene film, manufactured by Toray Co., Ltd.; LDPE: Low density polyethylene L211, manufactured by Sumitomo Chemical Co., Ltd.; KPT: Barrier coat film, manufactured by Unitika Ltd.

5. The packaging material according to claim 4, wherein the polyolefin resin of the sealant layer is a resin selected from the group consisting of polyethylene or polypropylene.

6. A method for producing a packaging material consisting of a barrier layer, an acid-modified polyethylene resin adhesive layer and a sealant layer,
- wherein the acid-modified polyethylene resin layer consists of an ethylene component, a (meth)acrylic acid ester component and an unsaturated carboxylic acid component that is formed on the barrier layer,
- the content of the (meth)acrylic acid ester component in the acid-modified polyethylene resin being 2 to 18% by mass,
- the content of the unsaturated carboxylic acid component in the acid-modified polyethylene resin being 1 to 4% by mass,
- the melt flow rate of the acid-modified polyethylene resin at 190° C. and a load of 21.3 N (2160 g) being 100 g/10 min or less, and
- a molten sealant resin is subsequently laminated on the adhesive layer by extrusion lamination.

7. The method for producing a packaging material according to claim 6, wherein the adhesive layer is formed by applying an aqueous dispersion of the acid-modified polyethylene resin to the barrier layer and by drying a thus applied aqueous dispersion.

* * * * *